United States Patent [19]
Malm et al.

[11] 3,708,792
[45] Jan. 2, 1973

[54] METER CIRCUIT FOR MEASURING THE MAKE-TO-BREAK RATIO OF PULSES

[75] Inventors: Marvin Forest Malm; Joseph Charles McKinney, both of Milan, Tenn.

[73] Assignee: International Telephone and Telegraph Corporation, New York, N.Y.

[22] Filed: Feb. 22, 1971

[21] Appl. No.: 117,533

[52] U.S. Cl. .........340/253 R, 340/253 Y, 178/69 A, 179/175.2 A
[51] Int. Cl. ............................................G08b 21/00
[58] Field of Search.........340/181, 253 Y; 178/69 A; 179/175.2 A; 324/60 CD

[56] References Cited

UNITED STATES PATENTS

| | | | |
|---|---|---|---|
| 1,577,046 | 3/1926 | Miller | 178/69 A |
| 3,410,967 | 11/1968 | Boring | 179/175.2 A |
| 3,096,400 | 7/1963 | Hutchinson | 178/69 A |
| 3,600,527 | 8/1971 | Blashfield | 179/175.2 A |
| 3,123,679 | 3/1964 | Donville et al. | 179/175.2 A |
| 2,826,648 | 3/1958 | Kessler | 179/175.2 A |

Primary Examiner—John W. Caldwell
Assistant Examiner—Robert J. Mooney
Attorney—C. Cornell Remsen, Jr., Walter J. Baum, Paul W. Hemminger, Charles L. Johnson, Jr., James B. Raden, Delbert P. Warner and Marvin M. Chaban

[57] ABSTRACT

A meter is calibrated to provide a direct reading of the ratio between the make portion and break portion of pulses in a telephone switching system as determined by measurement of the voltage appearing on a capacitor charged during the make pulses. The charge on the capacitor is provided directly from a fixed voltage source via relay contacts, resistors and a zener diode. These components together are selected to establish and maintain a voltage level on the capacitor which is proportional to the make-break ratio.

2 Claims, 1 Drawing Figure

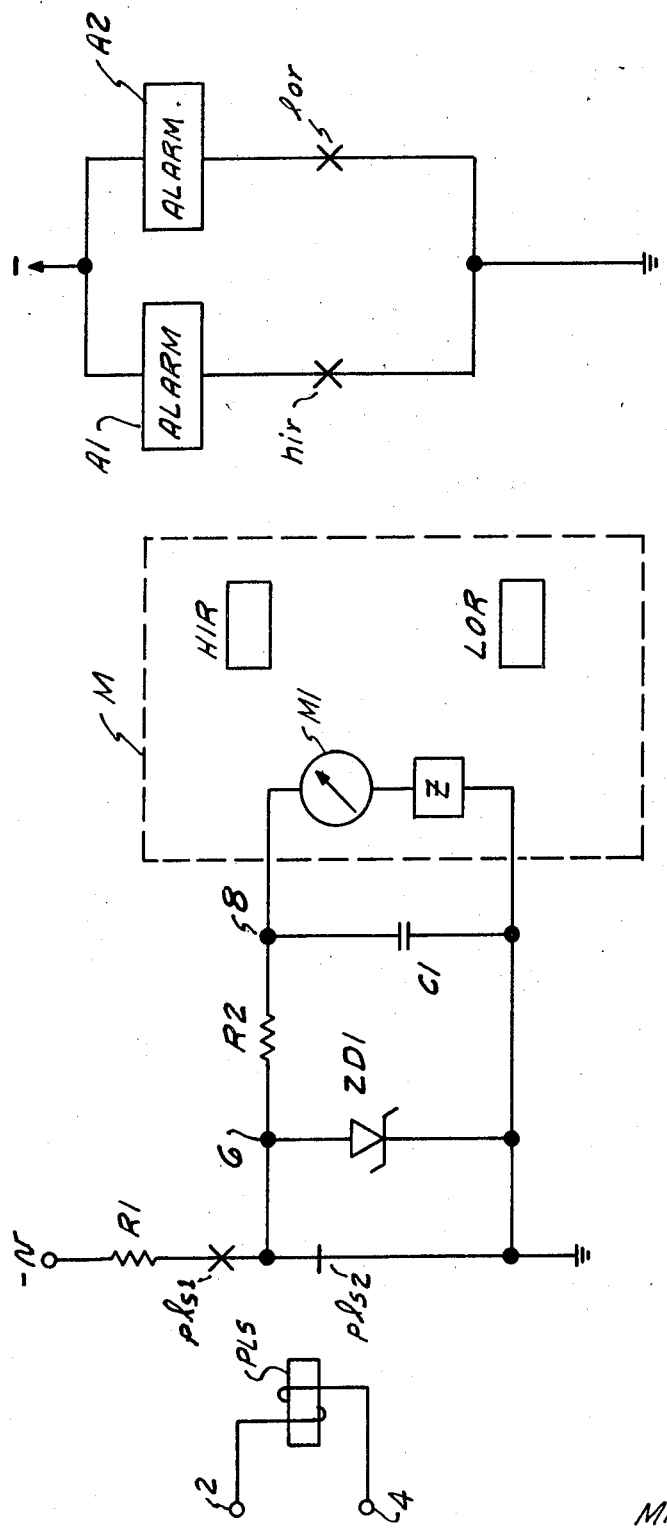

METER CIRCUIT FOR MEASURING THE MAKE-TO-BREAK RATIO OF PULSES

The present invention relates to the measurement of the ratio (duty cycle) between the make and break portions of a train of pulses. In particular, it relates to the measurement of such a ratio when the pulse changes are slow in comparison with the response time of a meter movement in measuring equipment.

In order to operate electromagnetic telephone switching equipment successfully, pulses having a 40 percent make (high energy) to a 60 percent break (low energy) ratio are commonly employed. During test periods it is particularly desirable that these ratios be present and that means be available to enable a speedy determination of whether the integrity of the pulse ratio, and therefore of the test, is being preserved.

A difficulty encountered in efforts to measure the make to break ratio of pulses arises from differences in the timing characteristics of the pulses and the meter. A typical ratio meter circuit in the prior art is basically like an ohmmeter. In telephone switching equipment, and especially in electro-mechanical telephone switching equipment, the time duration required for pulses is appreciably greater than the response period of meter movements. Consequently, in the absence of special circuits the meter needle will be seen to oscillate or "wiggle" when the pulses are applied, making it difficult to obtain an accurate reading. Furthermore, it has been necessary that prior art meters be "zeroed" before readings are made.

It is an object of this invention to provide means in a ratio meter for suppressing this "wiggle" or oscillation without introducing errors and without using complex and expensive circuitry.

It is a further object of the invention to provide means for maintaining linear relationships between the input signals and the output as given by the meter without using precision components.

It is yet another object of the invention to provide means to eliminate the need to "zero" the circuit before use or as the supply voltage varies.

The foregoing objects and others ancillary thereto are preferably accomplished in the following way. A relay is connected to receive the train of pulses being tested. This relay, through make contacts which are closed during make portions of the pulse train, applies a potential across a capacitor charging it towards a limit established by a zener diode. During break portions of the pulse train the capacitor is allowed to discharge slowly through a large resistor. The meter of interest is connected across the capacitor to measure potential present on the capacitor and is calibrated to give a direct reading of the ratio of make to break pulses.

The above mentioned and other features and objects of this invention and the manner of obtaining them will become more apparent, and the invention itself will be best understood by reference to the following description of an embodiment of the invention taken in conjunction with the accompanying drawing, in which the FIGURE shows an exemplary circuit of use in a practical embodiment of the invention.

Turning to the FIGURE, a relay PLS is shown for use in "following" pulses. The numerals 2 and 4 designate terminals across which the pulses being tested are received. As each make portion of the pulses arrives, the relay PLS is operated to close the make contacts *pls* 1 and open the break contacts *pls* 2. When break portions of pulses arrive, ground is present on both terminal 2 and terminal 4 and the relay releases, opening make contacts *pls* 1 and closing break contacts *pls* 2.

Initially, when the relay PLS is at rest, the meter M reads zero. When make pulses are applied the relay PLS is operated and the negative potential $-v$ is applied over resistor R1 through the make contact *pls* 1 to the terminal 6. The zener diode ZD1 establishes a limit to the voltage at 6 thereby providing a reference voltage which is relatively constant even if $-v$ varies. The zener reference voltage serves to eliminate the need to "zero" the circuit before use or as the supply voltage varies. The capacitor C1 is charged from terminal 6 through the resistor R2 and terminal 8.

When the relay PLS releases during the break portions of the pulses, make contacts *pls* 1 are released and break contacts *pls* 2 are closed. The capacitor C1 starts to discharge through R2 and *pls* 2. The values of R2 and C1 are chosen in accordance with values of the meter circuit M to provide the desired damping effect. The desired damping is related, of course, to the time constant for R2C1 which can be accurately established by selecting R2 and C1 to give the desired value. The damping capacitor may be selected, as an integral part of the circuit, to provide the desired damping with no loss of accuracy.

The same resistor R2 is used both in charging and discharging the capacitor so that the reading of the meter is accurate without necessitating the use of precision components.

The meter M1 initially reads zero when the pulses are applied over terminals 2 and 4. After a sufficient number of cycles, the charge on C1 will stabilize and the meter will provide a direct reading of the ratio of make to break pulses in the incoming train.

The actual values of the various components used will vary in accordance with such parameters as the voltage level of the incoming pulses, the value of $-v$, the characteristics of the meter circuit M and the amount of damping desired. The meter circuit used in an exemplary case was a Model 3326TX a meter relay manufactured by Simpson Electric Company. This meter relay incorporates DPDT relays, indicated at H1R and LOR which may be used to trigger alarms A1 and/or A2 by closing contacts such as *hir* and *lor*. The internal impedance, indicated at Z, is high to assure high accuracy with low current drain from the capacitor.

In an exemplary case, R1 was a 1 kilohm resistor, R2 was a 4.7 kilohm resistor, Z in the meter indicated a fixed 1.5 megohm in series with a variable 1 megohm, C1 had a capacitance of 5 microforads and the zener stabilized at 36 volts. Typically, the relay PLS will be a mercury relay or reed relay being driven by a 10 pulse per second generator in a telephone switching system.

While the principles of the invention have been described above in connection with specific apparatus and applications, it is to be understood that this description is made only by way of example and not as a limitation on the scope of the invention.

We claim:
1. A ratio meter circuit for measuring the ratio of make-to-break pulses in a pulse train comprising:

terminal means for receiving a pulse train having alternate high and low energy levels,
a relay coupled across said terminal means, and responsive to the high energy levels in said pulses to operate and close make contacts and open break contacts,
said make contacts, on closing, completing a path via which a potential is supplied through a resistor and across a capacitor to a ground terminal to impart a charge to the capacitor,
said break contacts, on being opened, breaking a path from a terminal through said resistor and said capacitor and back to said terminal over which said capacitor tends to discharge,
said relay responding to low energy levels to de-energize and restore said make and break contacts to their respective open and closed states,
return of said break contacts to a closed state completing a path through said resistor for partially discharging said capacitor, and
meter means coupled across said capacitor to measure the charge thereon and calibrated to provide an indication of the ratio of make-to-break pulses.

2. A circuit as claimed in claim 1, in which
a zener diode is placed across said resistor and capacitor, whereby
the potential supplied across the capacitor is regulated toward a constant level through operation of the zener diode.

* * * * *